United States Patent [19]
Lehe et al.

[11] Patent Number: 5,403,165
[45] Date of Patent: Apr. 4, 1995

[54] COMPACT HIGH POWER TURBOPUMP FOR A ROCKET ENGINE

[75] Inventors: Jean-Robert Lehe, Vernon; André Beaurain, Chambly, both of France

[73] Assignee: Societe Europeenne de Propulsion, Suresnes, France

[21] Appl. No.: 157,745

[22] Filed: Nov. 24, 1993

[30] Foreign Application Priority Data

Nov. 30, 1992 [FR] France ................ 92 14390

[51] Int. Cl.[6] .............................................. F04B 17/00
[52] U.S. Cl. ................................................... 417/406
[58] Field of Search ....................... 417/406, 407, 409; 60/605.3; 184/6.11; 415/58.2

[56] References Cited

U.S. PATENT DOCUMENTS

| | | | |
|---|---|---|---|
| 1,385,115 | 7/1921 | Cone | 415/58.1 |
| 2,956,502 | 10/1960 | Glaser, et al. | 103/87 |
| 3,105,631 | 10/1963 | Hänny | 417/407 |
| 3,734,649 | 5/1973 | Sandy, Jr. | 417/370 |
| 4,370,106 | 1/1983 | Lauterbach | 417/407 |
| 4,619,590 | 10/1986 | Johnson | 417/407 |

FOREIGN PATENT DOCUMENTS

| | | | |
|---|---|---|---|
| 1315307 | 5/1973 | United Kingdom | 417/407 |
| 1366715 | 1/1988 | U.S.S.R. | 415/58.2 |

OTHER PUBLICATIONS

"Over 40 Years of M.A.N. Exhaust Gas Turbochargers", *Diesel & Gas Turbine Worldwide*, Nov., 1982. pp.6–13.

"HM60 Cryogenic Rocket Engine for Future European Launchers", M. F. Pouliquen, Journal of Spacecraft and Rockets, vol. 21, No. 4, Aug. 1, 1984, New York, pp. 346–353.

*Primary Examiner*—Timothy S. Thorpe
*Attorney, Agent, or Firm*—Weingarten, Schurgin, Gagnebin & Hayes

[57] ABSTRACT

A compact high power turbopump for feeding liquid propellant to a rocket engine comprises: a short, large diameter shaft that is capable of rotating; a single impeller providing a large pressure rise at a large flow rate, the impeller being mounted on the short shaft so as to constitute a single pump stage; a ball bearing for supporting the short shaft in a small section zone thereof situated in front of the impeller; a fluid bearing dimensioned so as to withstand a high speed of rotation N and having a large diameter D, the fluid bearing serving to support the short shaft in a large section zone situated behind the impeller; a turbine cantilevered out on the short shaft behind the fluid bearing; an inducer of the high pressure type disposed upstream from the ball bearing on the suction pipe; and metal casing elements for the pump and for the turbine that are of simplified shape.

6 Claims, 6 Drawing Sheets

Fig_1

FIG_2 (PRIOR ART)

FIG._3 PRIOR ART

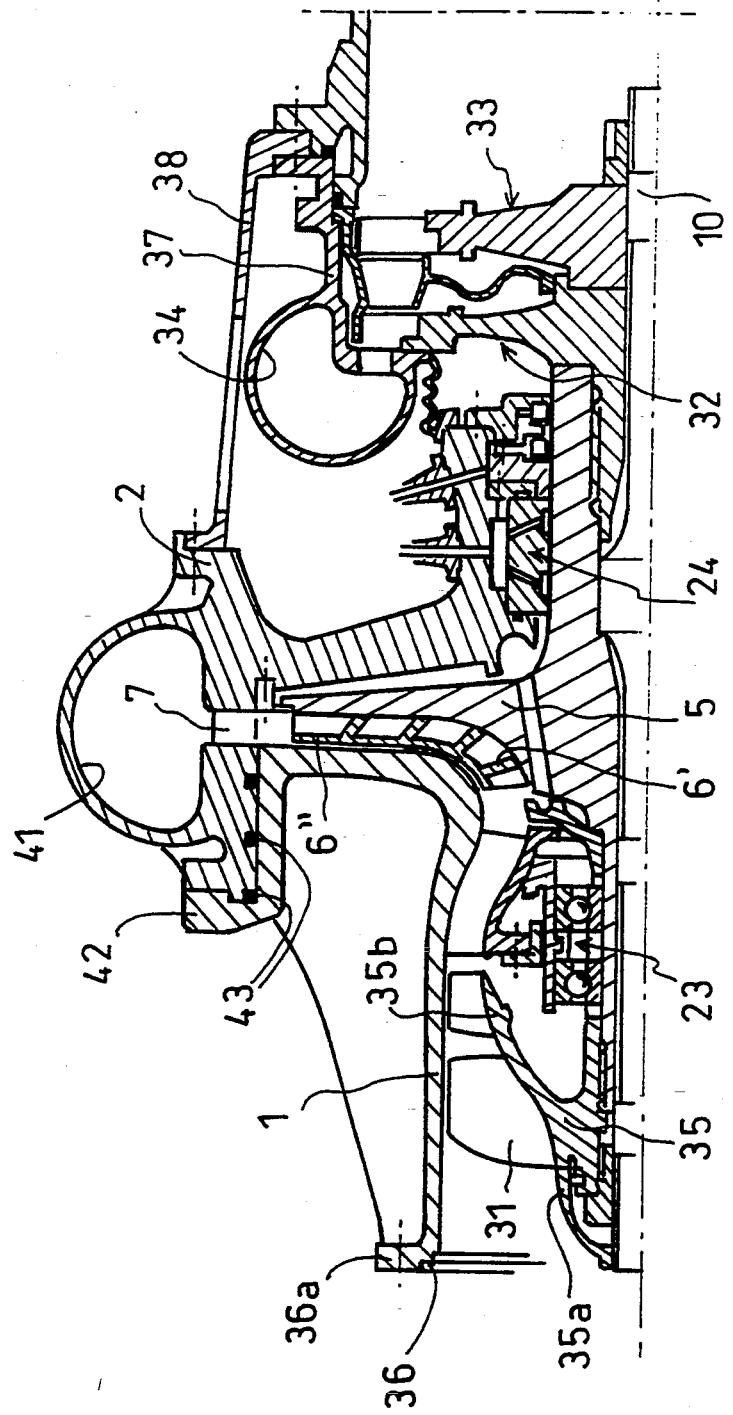
FIG_5

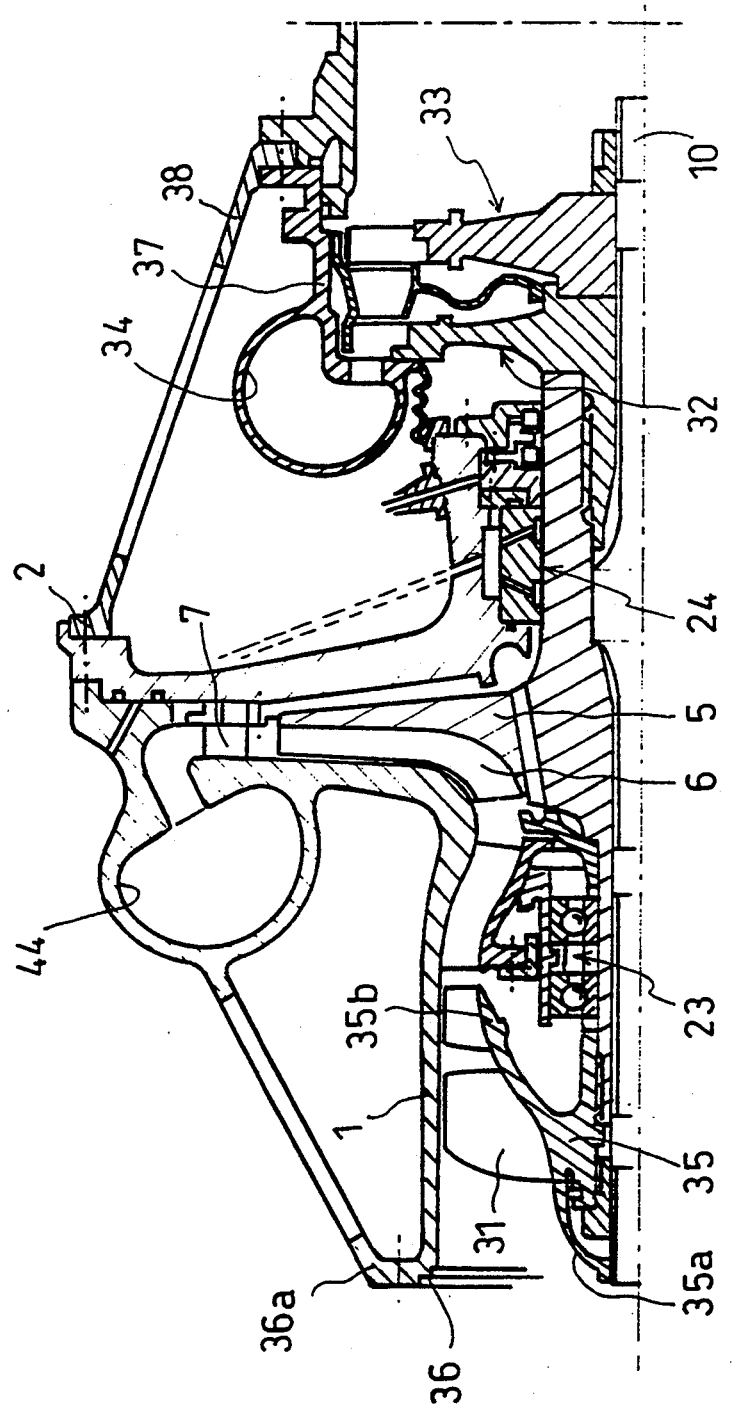
FIG_6

COMPACT HIGH POWER TURBOPUMP FOR A ROCKET ENGINE

FIELD OF THE INVENTION

The present invention relates to a compact high power turbopump operating at high pressure and high flow rate for feeding a rocket engine with a propellant liquid, in particular a cryogenic liquid, such as hydrogen.

PRIOR ART

The turbopumps of the rocket engines fitted to the first stage of a launcher are high power pumps and they are characterized by flow rates that are large at pressures that are medium or high, being of the order of 200 bar to 250 bar.

Conventional turbopump feed systems operating in such a range of pressure rise are complex since ordinary designs lead to the use of multistage impellers associated with a turbine bearing that requires a casing which is complex and expensive in order to make it possible to use a conventional ball bearing to achieve a speed of rotation that is high enough to achieve acceptable mass and bulk.

FIG. 2 shows a known "ALS" turbopump comprising two shrouded impellers 205, 255 provided with shrouds 205a and 255a and co-operating with a central shaft 222 to form a two-stage rotary assembly. The rotary assembly is supported by a first fluid bearing 223 disposed between the two impellers 205 and 255 and by a second fluid bearing 224 disposed between the impeller 255 constituting the second stage of the pump and two turbine stages 232 and 233. A conventional inducer 231 is disposed at the inlet to the first stage of the pump. References 206 and 204 respectively designate a duct providing a link between the outlet of the first stage of the pump and the inlet to the second stage of the pump, and a duct delivering working fluid from the outlet of the second stage of the pump. A diffuser 207 is disposed at the outlet from the second stage of the pump at the inlet to the toroidal delivery pipe 204. Reference 234 designates the toroidal manifold or "torus" for admitting hot gas to drive the turbines 233 and 232. The presence of two pump stages makes implementation of the casing 201, 202, and 209 complex and expensive. The multistage design of the turbopump leads to using a shaft 222 that is relatively long and thus requires damping means to be implemented. The use of two fluid bearings also contributes to increasing implementation costs.

FIG. 3 shows another example of a prior art multistage turbopump as fitted to cryogenic rocket engines and known under the name "Vulcain", such pumps serving to feed such engines with liquid hydrogen. The turbopump of FIG. 3 comprises a two-stage centrifugal pump in which each stage comprises an impeller 305, 355 provided with blades 306, 356 and secured to a common central rotary shaft 322. An inducer 331 confers good suction characteristics and enables a high speed of rotation to be obtained, of the order of 35,000 revolutions per minute (rpm) and is located at the inlet to the pump in the feed duct for working fluid. Two turbine stages 332 and 333 fed with a flow of hot gases injected by means of a torus 334 are secured to the central shaft 322 for the purpose of driving the shaft together with its impellers 305 and 355, and these turbine stages are disposed behind the second pump stage.

The central shaft 322 is supported by two ball bearings 323 and 324 disposed respectively in front of and behind the assembly constituted by the two-stage pump and the turbine. References 309 and 304 respectively designate a link duct between the outlet of the first pump stage and the inlet to the second pump stage, and the duct at the outlet from the second pump stage for delivering the working fluid, a diffuser 305 being disposed at the inlet to the toroidal delivery pipe 304.

As in the example of FIG. 2, the presence of two pump stages makes implementing the casing 301, 302 complex and expensive.

Because the shaft 322 in FIG. 3 is mounted on ball bearings 323 and 324 situated at opposite ends of the rotary assembly comprising both the two impellers 305, 355 and the turbine 322, 333, the shaft is long and that is liable to encourage the appearance of vibration. The ball bearings 323 and 324 are not capable themselves of providing any damping, so it is necessary to use separate damping devices, thus further complicating the implementation of such a turbopump and making it more expensive. The design of the casing over the turbine is particularly complex because of the ball bearing 324 that is present behind the turbine.

FIG. 4 shows another example of a high power turbopump, and in particular one that was designed for fitting to the "XLR 129" engine developed by the firm PRATT & WHITNEY.

In such a turbopump, the central shaft 422 is driven at its rear end by a first turbine stage 432 and by a second turbine stage 433, while its front end carries an inducer 431 together with an open-faced impeller 405 constituting a first stage and an open-faced impeller 455 constituting a second stage that are mounted back-to-back in opposition on bearings 423 and 424. The impellers 405 and 455 carry blades 406 and 456 that are positioned directly facing the thick walls of the casing 401, 402. Axial balancing is provided by a separate balancing piston 460 which constitutes an active force regulator, with the shaft 422 being free to move axially and positioning itself so that the sum of the axial forces is zero. Because of the presence of a separate balancing piston, it is difficult to control accurately the clearance between the open-faced impellers and the corresponding faces of the casing, so leakage losses can be large, thereby making it impossible to obtain high volumetric efficiency.

The multistage design of the pump and the presence of a separate balancing system make it impossible to obtain maximum compactness, and also make it impossible to design a simplified casing shape.

OBJECTS AND BRIEF SUMMARY OF THE INVENTION

The present invention seeks to remedy the above-specified drawbacks and to provide a high power turbopump making it possible to obtain a considerable increase in pressure, greater than about 200 bar, while offering the possibility of easier manufacture and greater compactness, thereby reducing cost price relative to known turbopumps operating over a similar range of pressure rises.

According to the invention, these objects are achieved by a compact high power turbopump for feeding propellant to a rocket engine, the pump comprising:

a) a short, large diameter shaft that is capable of rotating;
b) a single impeller providing a large pressure rise at a large flow rate, the impeller being mounted on the short shaft so as to constitute a single pump stage for receiving the propellant which constitutes its working fluid via a suction pipe and for delivering pressurized propellant via a delivery pipe;
c) a ball bearing for supporting the short shaft in a small section zone thereof situated in front of the impeller constituting the single pump stage;
d) a fluid bearing directly integrated in the casing elements of the pump is dimensioned so as to withstand a high speed of rotation N and having a large diameter D, the fluid bearing serving to support the short shaft in a large section zone situated behind the impeller constituting the single stage of the pump, the fluid bearing being directly fed with working fluid taken from the delivery channel immediately at the outlet from the impeller;
e) at least one turbine stage cantilevered out on the short shaft behind the fluid bearing and receiving a flow of hot gases via an admission torus;
f) an inducer of the high pressure type disposed upstream from the ball bearing on the suction pipe; and
g) metal casing elements for the pump and for the turbine that are of simplified shape.

The presence of bearings situated on either side of a single impeller with a ball bearing in front (that may be a cheap ball bearing) and a fluid bearing behind having high DN (product of diameter D multiplied by speed of rotation N), and capable of providing good damping, makes it possible to use a shaft that is short and of large diameter, rotating at high speed and without generating excessive vibration, and makes it possible to obtain an optimally compact assembly at reasonable cost.

The compactness of the architecture of the turbopump of the present invention leads to simplification in the implementation of its metal casing, and the casing may be made by casting, for example.

The impeller providing a large pressure rise and operating at a high flow rate may be a shrouded type of impeller or it may be an open-faced type of impeller.

With an open-faced impeller, an active axial balancing system for the impeller-and-shaft assembly is advantageously integrated in the impeller, thereby enabling small clearance to be maintained between the impeller and the casing, and consequently enabling leakage losses to be reduced, thus enabling high volumetric efficiency to be obtained.

The high pressure type inducer includes a hub having an outlet section that is larger in diameter than its inlet section.

The turbopump of the invention can thus operate using a single pump stage, without requiring a booster pump, thereby greatly simplifying manufacture thereof and reducing its cost, while nevertheless retaining sufficient power to enable the combustion chamber of a high thrust cryogenic rocket engine to be fed with propellant at the required nominal pressure.

BRIEF DESCRIPTION OF THE DRAWINGS

Other characteristics and advantages of the invention appear from the following description of particular embodiments, given as non-limiting examples, and made with reference to the accompanying drawings, in which:

FIG. 5 is an axial half-section view through a second particular embodiment of a turbopump of the invention; and FIG. 6 is an axial half-section view through a third particular embodiment of a turbopump of the invention.

DETAILED DESCRIPTION OF PARTICULAR EMBODIMENTS

Figure 1:
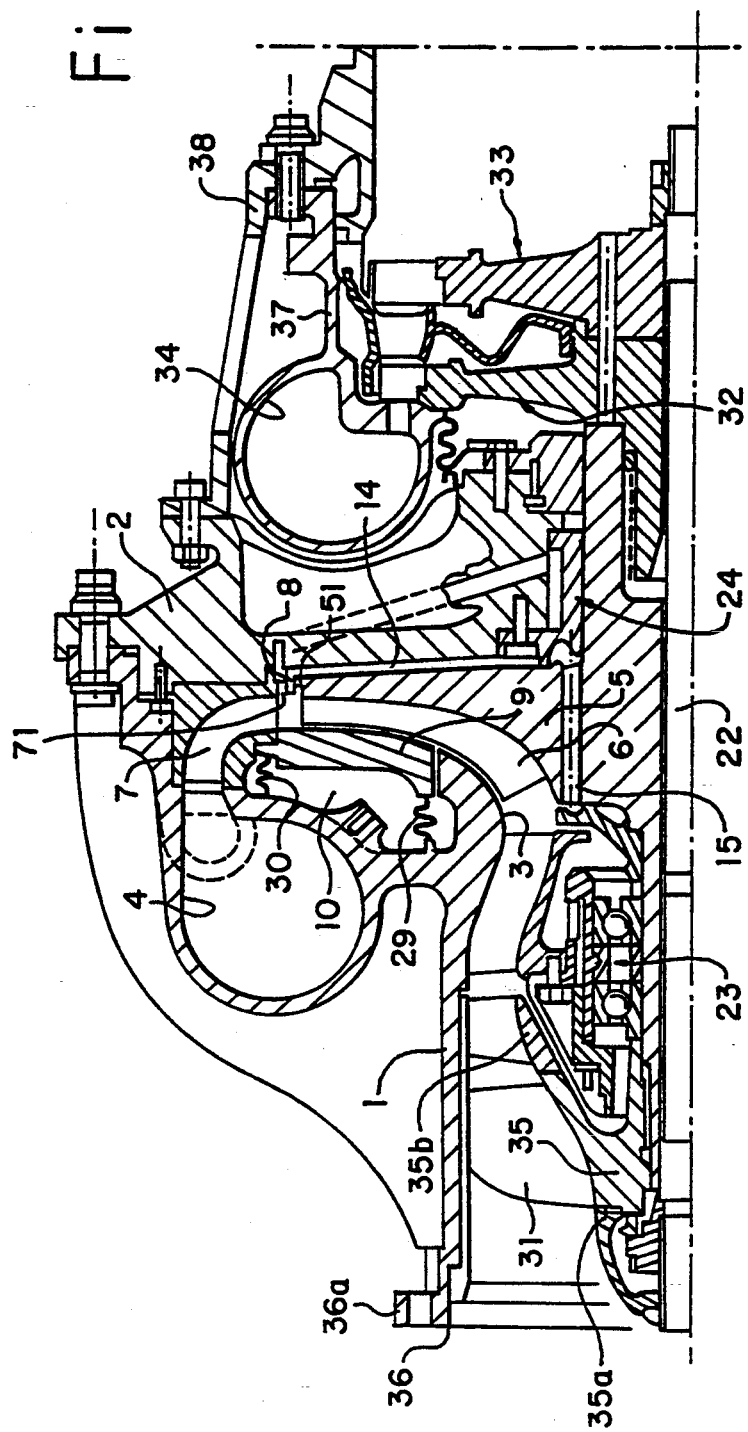
FIG. 1 is an axial half-section view through a high power turbopump constituting a first particular embodiment of the invention.
Figure 2:
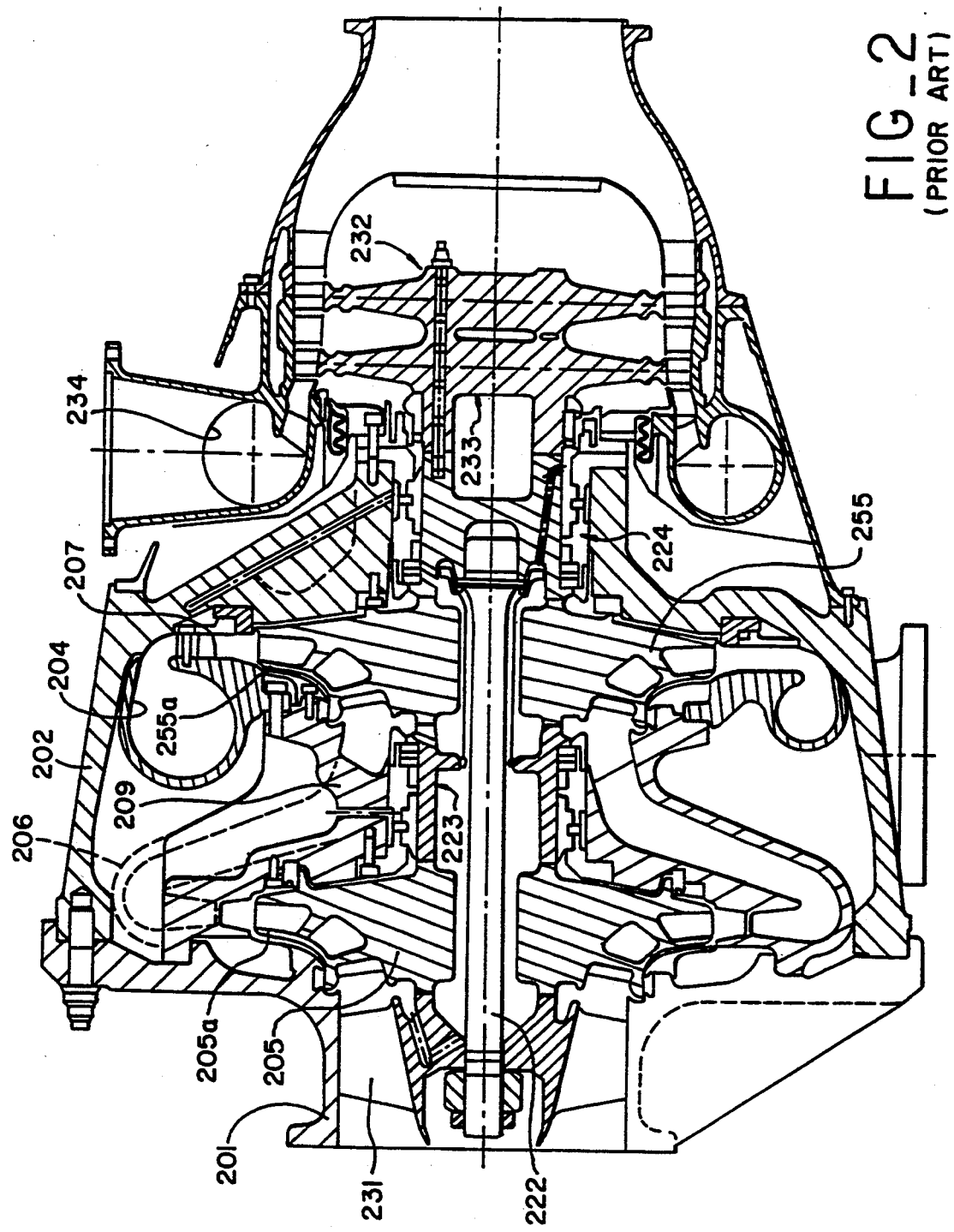
FIG. 2 is an axial section view through a first example of a prior art high power turbopump.
Figure 3:
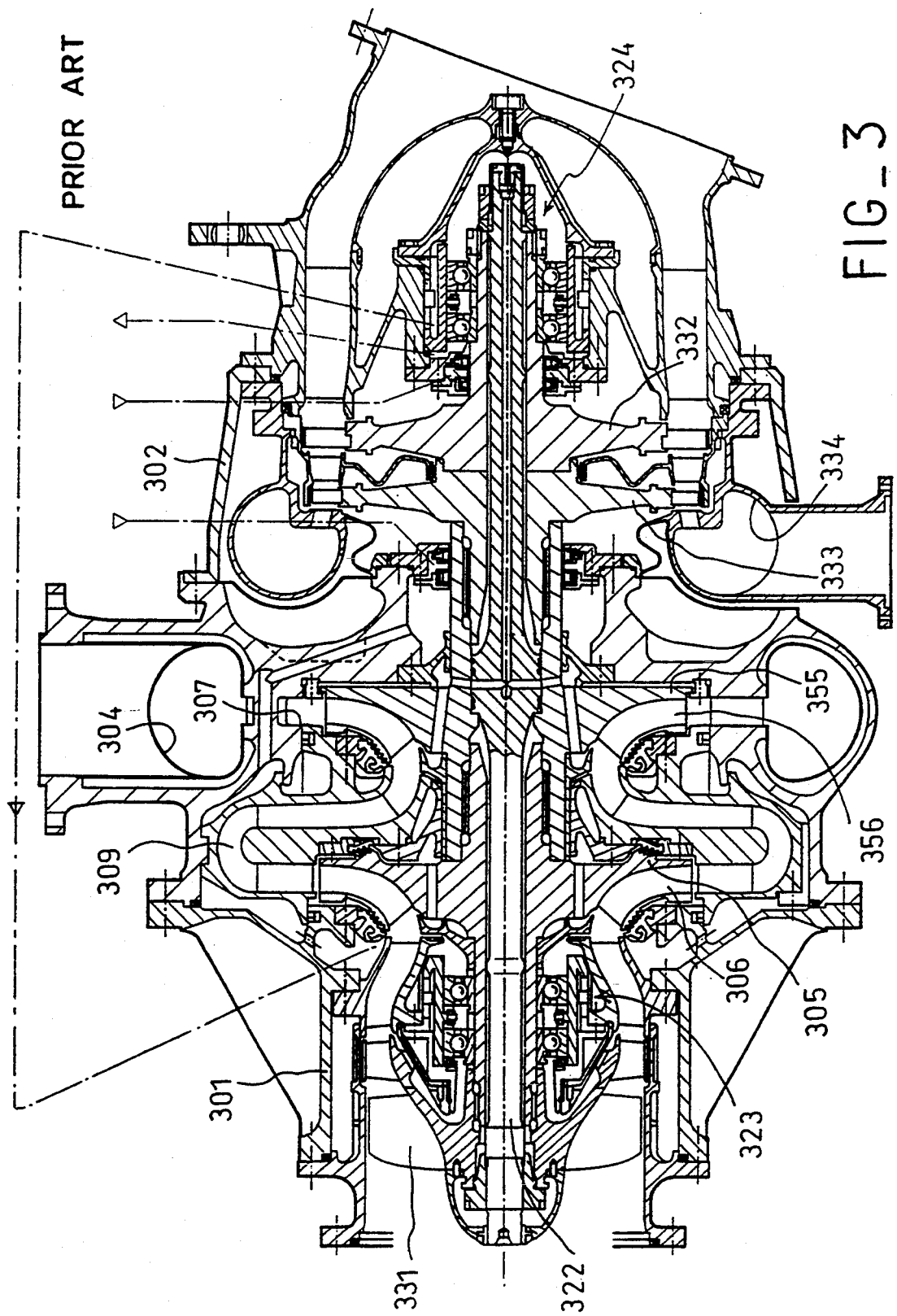
FIG. 3 is an axial section view through a second example of a prior art high power turbopump.
Figure 4:
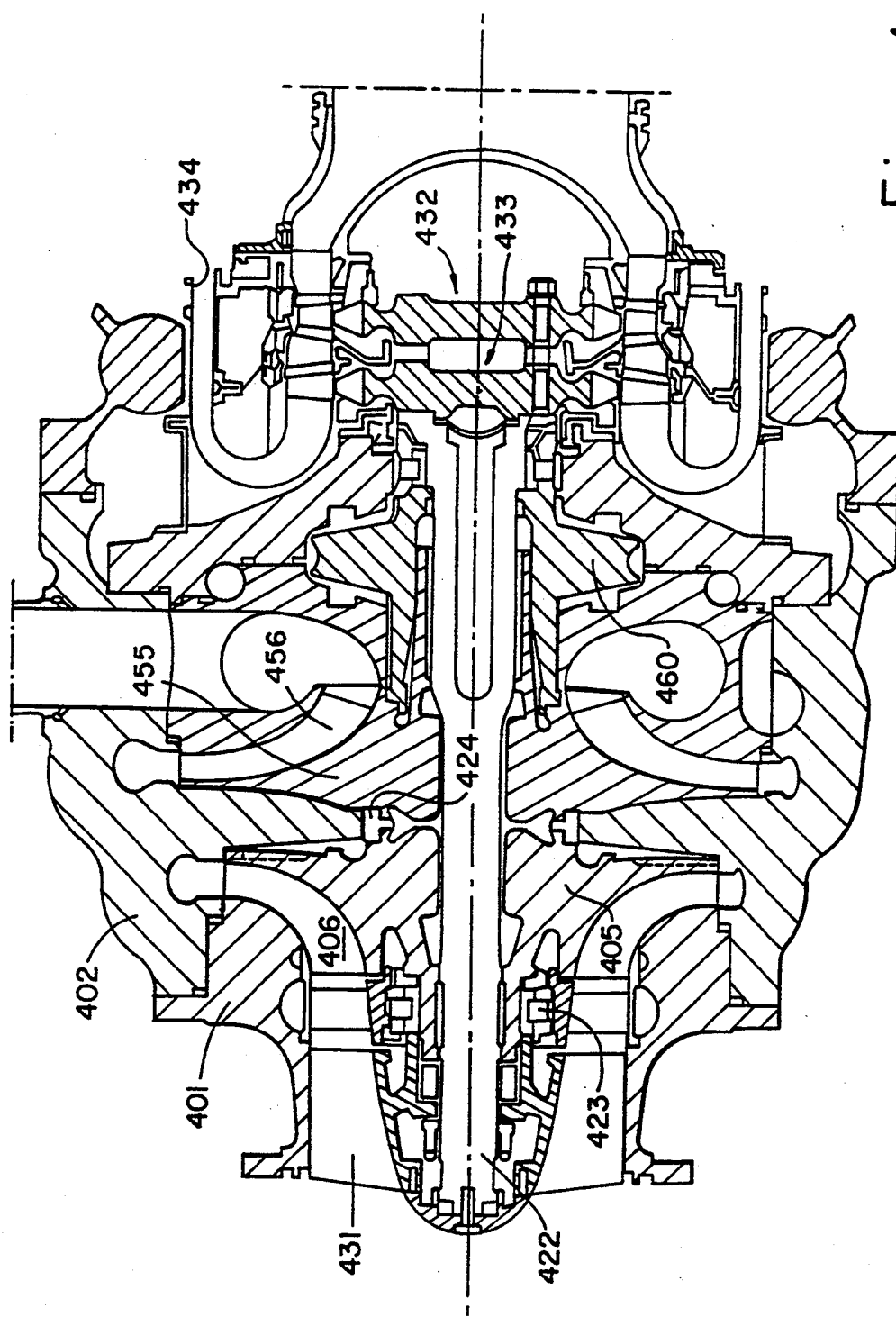
FIG. 4 is an axial section view through a third example of a prior art high power turbopump.

Reference is made initially to FIG. 1 which shows the general structure of a turbopump of the invention.

The turbopump of the invention belongs to the class of high-power turbopump that enables a combustion chamber of a cryogenic rocket engine to be fed with propellant (e.g. liquid hydrogen) at a nominal pressure lying in the range about 200 bar to about 250 bar.

Such turbopumps enable a pressure to be achieved in the burn region of the combustion chamber of the order of 150 bar, thereby making it possible to implement high thrust engines cheaply that provide good performance in terms of specific impulse (high) and in terms of mass (low).

As mentioned above, conventional turbopump feed systems operating at pressures of more than 200 bar are complex because they use multistage impellers as made necessary for obtaining a speed of rotation that is high enough to enable acceptable compactness to be achieved. Unfortunately, the cost of the propellant feed system, including its turbopumps, has a significant influence on the total cost of making a cryogenic engine.

The architecture of FIG. 1 makes it possible to achieve a considerable reduction in the development costs and in the manufacturing costs of a high-power turbopump.

The turbopump of FIG. 1 essentially comprises a rotary assembly built around a central shaft 22 that is short in length, and that includes a single impeller 5 for a one-stage centrifugal pump mounted on the shaft 22 in the middle portion thereof, together with two turbine disks 32 and 33 mounted on the rear portion of the shaft 22.

The turbine disks 32 and 33 are mounted on a cantilevered-out rear portion of the shaft 22 and they rotate the shaft under drive from a flow of hot gases applied to the periphery of the turbine disks 32 and 33 from a gas feed torus 34.

In FIG. 1, the single stage pump is shown as having an open-faced type impeller 5 provide with blades 6 that receive the working fluid through a suction pipe 3 and that deliver the pressurized working fluid to a delivery pipe 4.

A high pressure inducer 31 is disposed at the inlet of the centrifugal pump on the path of the working fluid that is delivered axially via the inlet section 36.

After passing through the inducer 31, the working fluid is applied directly to the suction pipe 3 of the pump. The high pressure inducer 31 includes a hub 35 whose right cross-section 35b has a diameter greater than the diameter of the inlet section 35a so as to provide pressures at the inlet of the main impeller 5 at high speeds of rotation. The presence of a high pressure inducer 31 contributes to avoiding the need to use a booster pump, to reducing the size of the machine, and to facilitating installation of a ball bearing 23 in a region of the shaft 22 that is of small section, situated between the inducer and the impeller 5 of the pump. A fixed diffuser 7 may also be placed facing the peripheral ends of the blades 6 in the delivery pipe 4.

The ball bearing 23 may be made cheaply. Because of the low power transmitted by the impeller 5 to the inducer 31, the location of the ball bearing between the impeller 5 and the inducer 31 makes it possible to use a product of diameter D multiplied by speed of rotation N that is moderate, thereby facilitating development and increasing reliability and lifetime of this component and of the machine.

A fluid bearing 24, e.g. a hydrostatic bearing, is located in a zone of the rotary assembly between the impeller 5 and the two turbine stages 32 and 33, which zone is of relatively large section, thereby enabling the turbine disks to be cantilevered out therefrom.

The fluid bearing 24 may have a product DN of diameter D multiplied by speed of rotation N which is large, and its position between the pump and the turbine 32, 33 makes it possible to simplify the architecture of the casing considerably in its portion 37, 38 that is situated around the turbine 32, 33. The small radial size of the rear fluid bearing 24 makes it possible to reduce the axial size of the machine by overlapping the torus 34 for admitting hot gases into the turbine around the outside of the portion of the casing 1, 2 that defines the single stage pump.

The various portions 1, 2, 37, 38 constituting the casing may be made by casting under conditions of cost and ease of implementation that are much better than those of conventional solutions.

The fluid bearing 24 may be fed directly with fluid from the pump, taken from the working fluid outlet pipe 4. The dynamic characteristics of the fluid bearing 24 serve to provide the shaft 22 with the damping necessary to enable it to operate smoothly. The size of the fluid bearing 24 expressed in terms of the product DN, and the fact that the fluid bearing 24 is capable of providing damping in the immediate vicinity of the impeller 5 minimize dynamic problems in the shaft line. Other shock absorbers for the shaft line 22 can consequently be much smaller or completely eliminated. Surface treatment of the fluid bearing can make it possible to start up rotation of the rotary assembly without there being any need to include any auxiliary apparatus.

FIG. 1 shows the implementation of an impeller 5 that is of the open-faced type.

It may be observed that machining an open-faced impeller can be relatively simple, thereby reducing manufacturing costs.

Advantageously, an active axial balancing system for the rotary assembly is integrated in the impeller and comprises a balancing chamber 14 interposed between the rear face of the body of the impeller 5 and an outer rear portion 2 of the pump casing 1, 2. The balancing chamber 14 communicates with the delivery pipe 4 via a nozzle 8 whose axial clearance remains unvarying in operation and which is defined by the periphery 51 of the impeller acting as a balancing turntable and a nozzle piece 71 secured to the outer rear portion 2 of the pump casing 1, 2 and interposed between the diffuser 7 and the periphery 51 of the impeller.

According to an optional feature of the open-faced impeller of the invention, a shroud-forming intermediate part 9 that is prevented from rotating relative to the pump casing 1, 2 is interposed between an outer front portion 1 of the casing 1, 2 and the impeller 5. A cavity 10 is formed between the outer front portion 1 of the pump casing 1, 2 and the intermediate part 9 to receive a predetermined value of back pressure enabling reduced clearance to be maintained in operation between the intermediate part 9 and the blades 6 of the impeller 5 but without allowing them to come into contact. For example, the intermediate part 9 may be connected to the front portion 1 of the pump casing 1, 2 by bellows 29, 30 which serve simultaneously to provide sealing, to hold the intermediate part 9 in position at rest, and to urge said intermediate part 9 against the diffuser 7.

FIG. 5 shows a variant embodiment of the FIG. 1 turbopump, and in particular it shows a different design of the casing components. In FIG. 5, the pressurized working fluid thus departs radially from the periphery of the impeller 5 and penetrates into the delivery pipe 41 which is disposed in substantially the same radial plane as that which contains the impeller 5. In this case, the toroidal delivery pipe 41 can be completely defined by the rear portion 2 of the pump casing 1, 2 which extends forwards for this purpose in front of the plane of the impeller 5. The shape of the front portion 1 of the pump casing can be greatly simplified so that its section in an axial half-plane is approximately in the form of a letter U with an inner end 36a forming a flange that defines the inlet section 36 for the working fluid, and an outer end 42 forming a flange that may be pressed against the front end of the rear portion 2 of the casing that surrounds the single stage pump. Reference 43 designates sealing rings between the two portions 1 and 2 of the pump casing.

Unlike the embodiment of FIG. 5, the embodiment of FIG. 1 shows a front portion of the pump casing which defines the entire toroidal duct 4 for delivering working fluid, with the join zone between the front and rear portions 1 and 2 of the pump casing 1, 2 lying substantially in the same plane as the impeller 5.

In the embodiment of FIG. 1, as in the embodiment of FIG. 5, the admission torus 34 for the hot gases that drive the turbine disks 32 and 33 lies outside the casing 1, 2 of the single stage centrifugal pump and forms a portion of a turbine casing 37, 38 which may be made up of two cast pieces of very simple shape and which can easily be dismantled without disturbing the main casing 1, 2 of the centrifugal pump. The fluid bearing 24 is itself directly integrated in the rear portion 2 of the pump casing, thereby further contributing to facilitating implementation of the turbine casing.

FIG. 5 also shows a shrouded impeller having blades 6' whose free edges are connected to a front shroud 6". The geometrical shapes of the shrouded impeller (thickness and profile of the blades 6', of the hub-forming portion 5, and of the shroud 6") are optimized to enable pressure rises of the order of 200 bar to 250 bar to be obtained. In order to confer sufficient mechanical strength to the shrouded impeller and in order to facilitate implementation of optimized geometrical shapes, while keeping costs down, the shrouded impeller is made by the powder metallurgy technique or by plasma deposition instead of by the traditional method of machining by milling or by electro-erosion.

When using an open-faced impeller as when using a shrouded impeller, it is preferable to use a pump impeller 5 that has no central orifice. Such an impeller makes it possible to achieve the peripheral speeds required by the range of pressure rises under consideration.

FIG. 6 shows yet another possible embodiment of a turbopump of the invention. The turbopump of FIG. 6 is similar to that of FIG. 1, having an open-faced impeller, however there is no intermediate part 9 nor is there any cavity 10 for applying a back pressure. FIG. 6 also shows a pump casing 1, 2 whose design is a little different from that of FIG. 1 while nevertheless remaining very simple. A mechanical connection in the front portion 1 of the pump casing connects the toroidal duct 44 for delivering pressurized working fluid to the flange 36a that defines the inlet section 36 for the working fluid.

Naturally, numerous modifications can be applied to the various embodiments described and those embodiments can themselves be combined. Thus, a shrouded impeller can be used with a pump casing 1, 2 of the type described with reference to FIGS. 1 or 6, and conversely an open-faced impeller could be used in a pump casing 1, 2 as shown in FIG. 5.

In general, the dynamic behavior of the shaft line is improved by using a short shaft 22 that defines a relatively large section in the fluid bearing 24.

Turbopumps of the invention can be used with cryogenic rocket engines capable of delivering thrust that lies in the range 1300 kN to 4000 kN, for example.

We claim:

1. A compact high power turbopump for feeding propellant to a rocket engine, the pump including casing elements and comprising:

a shaft that is capable of rotating, said shaft having a first diameter portion and including a second diameter portion of a diameter less than said first diameter portion;

an inducer positioned on first end of said shaft;

a single impeller, the impeller being mounted on the shaft to constitute, with said inducer, a single pump stage receiving the propellant which constitutes its working fluid via a suction pipe and delivering pressurized propellant via a delivery pipe;

a ball bearing supporting the shaft at said second diameter portion situated between the single impeller and the inducer;

a fluid bearing integrated in the casing elements, the fluid bearing serving to support the shaft at a region of said first diameter portion, the fluid bearing being directly fed with working fluid taken from the delivery pipe of the single impeller;

at least one turbine stage at a second end of the shaft cantilevered out on the shaft adjacent the fluid bearing and receiving a flow of hot gases via an admission torus.

2. A compact turbopump according to claim 1, wherein the casing elements are made by casting metal.

3. A compact turbopump according to claim 1, wherein the single impeller is a shrouded type impeller.

4. A compact turbopump according to claim 1, wherein the single impeller is an open-faced type impeller.

5. A compact turbopump according to claim 4, including an active axial balancing system incorporated in an assembly comprising the shaft and the single impeller.

6. A compact turbopump according to claim 1, wherein the inducer has a hub having an inlet section and an outlet section, the diameter of said outlet section being greater than that of said inlet section.

* * * * *